United States Patent
Sodhi et al.

(10) Patent No.: US 8,954,771 B2
(45) Date of Patent: Feb. 10, 2015

(54) SPLIT DEEP POWER DOWN OF I/O MODULE

(75) Inventors: Inder M. Sodhi, Folsom, CA (US); Amjad M. Khan, Folsom, CA (US); Zeev Offen, Folsom, CA (US); Ryan D. Wells, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 13/342,023

(22) Filed: Dec. 31, 2011

(65) Prior Publication Data

US 2013/0173902 A1 Jul. 4, 2013

(51) Int. Cl.
 *G06F 1/26* (2006.01)
 *G06F 1/32* (2006.01)
(52) U.S. Cl.
 CPC ............................ *G06F 1/3296* (2013.01)
 USPC .......................................................... 713/320
(58) Field of Classification Search
 CPC ................................................. G06F 11/3296
 USPC .......................................................... 713/320
 See application file for complete search history.

(56) References Cited

U.S. PATENT DOCUMENTS

| | | | | |
|---|---|---|---|---|
| 5,167,024 A * | 11/1992 | Smith et al. | | 713/322 |
| 5,815,693 A * | 9/1998 | McDermott et al. | | 713/501 |
| 6,546,472 B2 * | 4/2003 | Atkinson et al. | | 711/156 |
| 8,438,358 B1 * | 5/2013 | Kraipak et al. | | 711/167 |
| 8,504,121 B1 * | 8/2013 | Pan | | 455/574 |
| 2003/0056127 A1 * | 3/2003 | Vaglica | | 713/300 |
| 2007/0040813 A1 * | 2/2007 | Kushler et al. | | 345/173 |
| 2009/0085607 A1 * | 4/2009 | Zelikson et al. | | 326/83 |

* cited by examiner

*Primary Examiner* — Jaweed A Abbaszadeh
*Assistant Examiner* — Alyaa T Mazyad
(74) *Attorney, Agent, or Firm* — Blakely, Sokoloff, Taylor & Zafman LLP

(57) ABSTRACT

I/O logic can be separated into critical and non-critical portions, with the non-critical portions being powered down during processor idle. The I/O logic is separated into gate logic and ungated logic, where the ungated logic continues to be powered during a processor deep sleep state, and the gated logic is powered off during the deep sleep state. A power control unit can trigger the shutting down of the I/O logic.

18 Claims, 13 Drawing Sheets

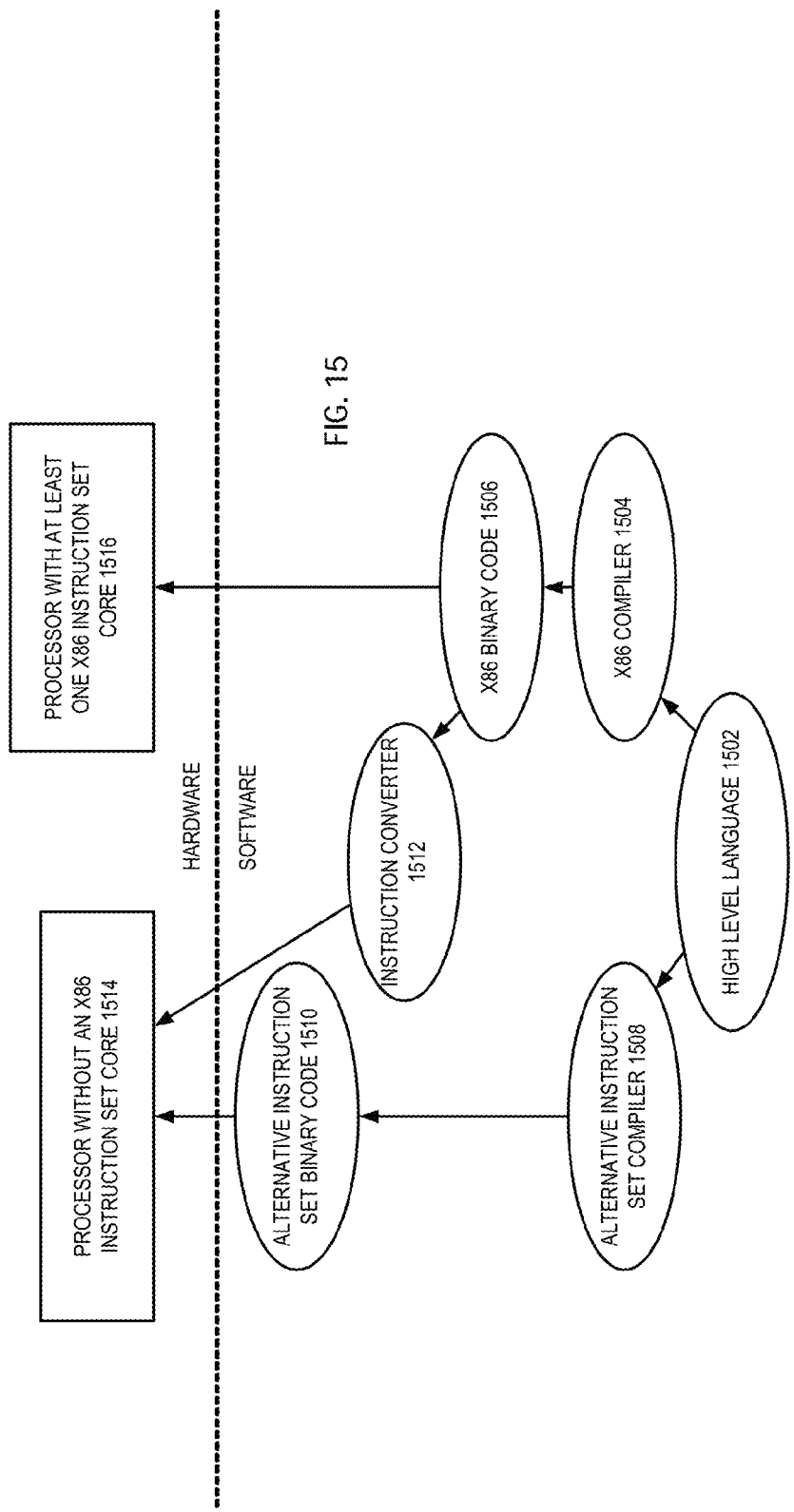

SPLIT DEEP POWER DOWN OF I/O MODULE

FIELD

Embodiments of the invention are generally related to power management, and more particularly to processor power consumption.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2011, Intel Corporation, All Rights Reserved.

BACKGROUND

Processors are commonly complex systems that include processing logic as well as circuits intended to interface with one or more devices or other integrated circuits (I/Cs—i.e., "chips") external to the processor. The interface circuits provide I/O (input/output) between the processor and the external device. Frequently a processor includes a customized I/O interface for specific types of devices (e.g., specialized memory interfaces).

When a processor enters a deep sleep state, the I/O interfaces commonly still draw power. Thus, even when the processor enters a low power mode, the I/O may draw significant amounts of power in idle scenarios. One of the reasons the I/O interfaces draw power is that the devices to which they connect may need to continue to perform certain critical functions, and/or because powering down the interface would cause a loss of configuration of the I/O module.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 15 is a block diagram of one embodiment contrasting the use of a software instruction converter to convert binary instructions in a source instruction set to binary instructions in a target instruction set.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, I/O logic is separated into gated and ungated portions, with the gated portions being powered down during processor idle. The separation of gated and ungated logic can correspond to logic that does not provide critical functions and logic that does provide critical functions, respectively. Additionally, ungated logic can include logic that should remain powered to prevent loss or change of configuration of the I/O module. Thus, the I/O module can be separated into logic that continues to be powered during a processor deep sleep state, and logic that is powered off during the deep sleep state.

In one embodiment, a power control unit (PCU) triggers the shutting down of the I/O logic. Hardware logic coupled to the I/O module can perform the actual powering down of the I/O logic. Thus, the control of the powering down can be performed in hardware, and be restored quickly enough so that there is not an interruption in the operation of the system from the perspective of software.

Figure 1:
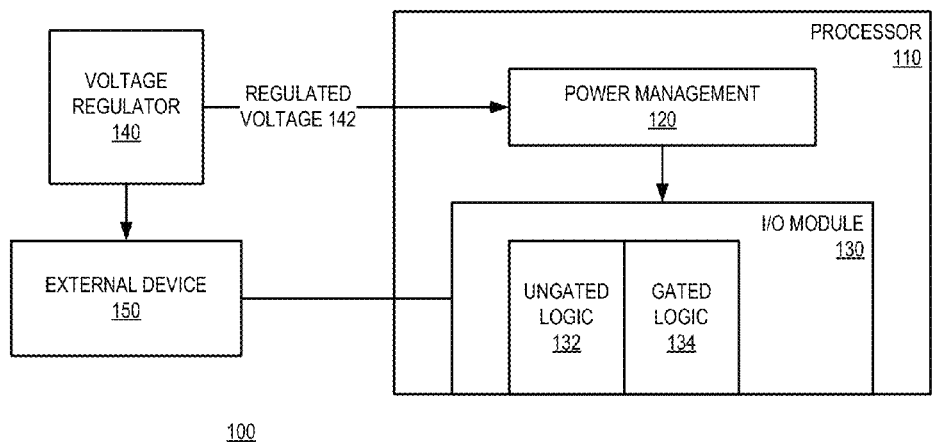
FIG. 1 is a block diagram of an embodiment of a system with an I/O module having gated and ungated logic.

FIG. 1 is a block diagram of an embodiment of a system with an I/O module having gated and ungated logic. System 100 includes processor 110 and voltage regulator 140. voltage regulator 140 provides regulated voltage 142 to power management 120 of processor 110. It will be understood that system 100 can include multiple different voltage regulators, which can provide multiple different voltage levels. Regulated voltage 142 powers I/O module 130, which connects to external device 150. In one embodiment, voltage regulator 140 provides the same voltage level to external device 150 as provided to I/O module 130.

I/O module 130 includes ungated logic 132 and gated logic 134. The "logic" refers to hardware (circuits, registers, controllers, clocks, signal generators, or other hardware) used with an interface to external device 150. The logic can be logic that drives signal lines, buffers data, or other logic. The interface to external device 150 can include multiple different signal lines, with data buses, command lines, control signals, or other interfaces. Some of the logic in I/O module 130 can be shut off during idle periods of processor 110 to save power. The ability to power down the processor I/O enables additional power saving during low power states of the processor.

While not specifically shown in system 100, gated logic 134 is gated by power management 120. See FIG. 2 below for more details of one example embodiment. Power management 120 receives regulated voltage 142 and selectively provides voltage to I/O module 130, switching power for logic that can be shut off during low power operation. In one embodiment, power management 120 includes control logic to determine how to gate regulated voltage 142 to the logic of I/O module 130.

In one embodiment, system 100 is a mobile system, where battery life is a significant consideration. By selectively gating the logic of I/O module 130, the system can have lower power consumption in low power operation. Thus, system 100 would have a lower average power than a traditional system while still meeting high performance targets during normal operation. System has lower average power consumption (e.g., in one embodiment, sub 1 Watt) at least due to lower leakage power by turning off gated logic 134 when processor 110 is idle.

Figure 2:
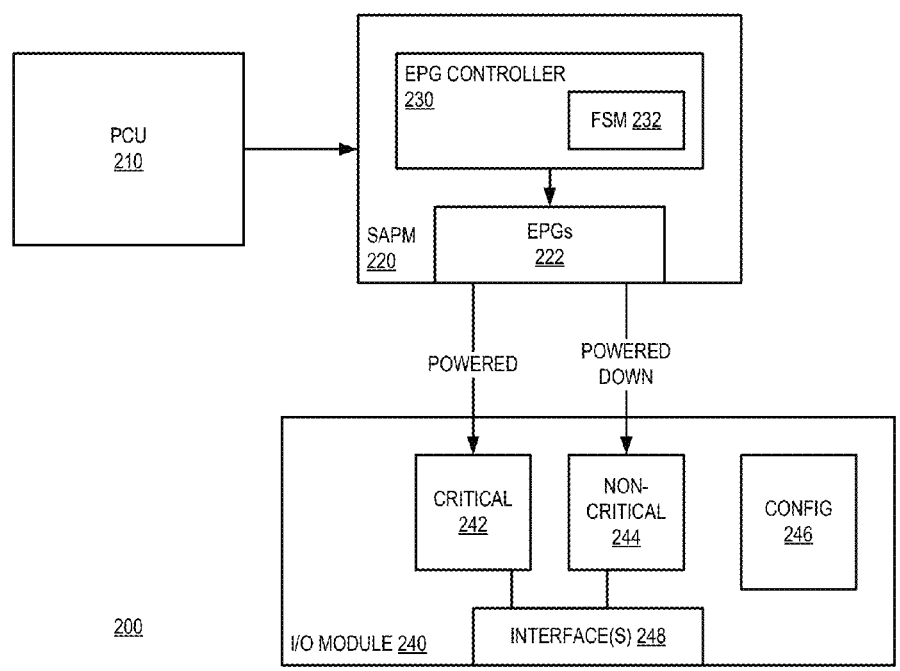
FIG. 2 is a block diagram of an embodiment of a system having critical I/O logic that operates on low power in system deep sleep mode, and non-critical I/O logic that operates in total shutdown in system sleep mode.

FIG. 2 is a block diagram of an embodiment of a system having critical I/O logic that operates on low power in system deep sleep mode, and non-critical I/O logic that operates in total shutdown in system sleep mode. Processor 200 can be one example of a processor in accordance with processor 110 of FIG. 1. In one embodiment, processor 200 includes all the components illustrated in FIG. 2. Other embodiments are possible with more or fewer components than what are shown.

Processor 200 receives power from a voltage regulator, which is then selectively switched to the logic of I/O module 240. PCU (power control unit) 210 controls power in processor 200, both for I/O module 240 and other components of the processor. SAPM (system agent power management) 220 is a power management controller for I/O module 240. In one embodiment, every component external to the processing cores has a separate SAPM (e.g., display, memory controller, or others). In one embodiment, SAPM 220 is part of PCU 210. In another embodiment, SAPM 220 is a discrete component separate from PCU 210.

In one embodiment, SAPM 220 includes EPGs (embedded power gates) 222, which control the gating or switching of power to I/O module 240. In particular, EPGs 222 are responsible for providing power to critical logic 242, and for powering down non-critical logic 244. EPGs 222 are controlled by EPG controller 230. In one embodiment, EPG controller 230 is or includes finite state machine (FSM) 232, which provides control based on a state of operation. The implementation of a finite state machine is known in the art and will not be discussed in detail herein.

In one embodiment, as shown, I/O module 240 has logic separated as critical 242 and non-critical 244. Critical logic 242 can be considered logic that is necessary to maintain data and/or configuration of the external device associated with I/O module 240, and/or to maintain configuration 246 of I/O module 240. For example, in the case of dynamic memory, the memory must be refreshed regularly to prevent the loss of determinative state of the memory elements. Thus, refresh control could be considered a critical function for a memory interface to prevent loss of data. Additionally or alternatively, configuration could be lost at the external device or the I/O module, or both if power is interrupted to certain logic components. For example, some registers are used to store configuration values, which should continue to be powered to avoid losing data. Some registers are static (their values only change when overwritten, and can continue to be read even after a power interruption); however, many registers are implemented in dynamic logic and may need to remain powered.

Non-critical logic 244 is all other logic that is not necessary to maintain state and/or configuration of I/O module 240. When processor 200 enters a low power state (e.g., due to an idle period), critical logic 242 can remain powered, while non-critical logic 244 is powered down.

In one embodiment, FSM 232 is implemented in PCU 210, rather than in SAPM 220. In one embodiment, PCU 210 includes an FSM in addition to FSM 232. In one embodiment, SAPM 220 is the state machine of PCU 210. PCU 210 handles sequencing of the state changes and assertion of command signals. In one embodiment, PCU 210 includes heuristics computations that determine when to trigger cutting off power to non-critical logic 244. It will be understood that if the logic is shut down every time the processor is idle, it may need to be brought back up again almost as soon as it is shut down. The constant switching between powering down and powering up would actually result in an increase in power usage. Thus, in one embodiment, PCU 210 determines when to power down the I/O components.

In one embodiment, EPG controller 230 handles I/O voltage (e.g., VccP) sequencing and isolation logic to gate the logic of I/O module 240. In one embodiment, EPGs 222 are EPG stripes that provide split plane power delivery to I/O module 240. In one embodiment, processor 200 includes PLLs, fuses, and one or more memory controllers that are modified to handle the operation of selectively switching power to I/O module 240.

Figure 3:
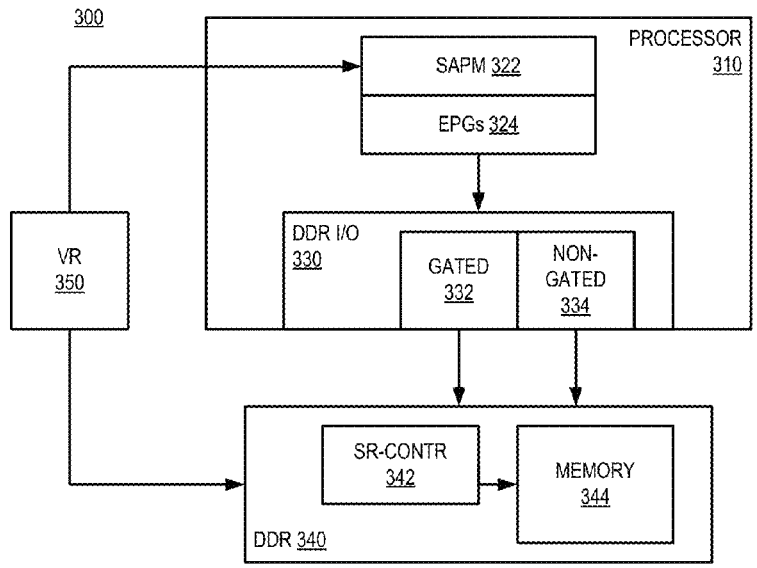
FIG. 3 is a block diagram of an embodiment of a system having DDRIO logic coupled to a DDR memory device.

FIG. 3 is a block diagram of an embodiment of a system having DDRIO logic coupled to a DDR memory device. System 300 performs gating of an I/O module in accordance with any embodiment described herein. In the specific example of system 300, processor 310 includes DDR I/O (simplified as DDRIO) 330 to interface with DDR memory device 340.

With DDRIO 330, the entire I/O module cannot be put to sleep or processor 310 would lose configuration. Thus, there is logic that can be gated and logic that should not be gated. Voltage regulator (VR) 350 powers both DDRIO 330 and DDR 340. It will be understood that because the voltage regulator supplies voltage to both DDRIO 330 and DDR 340, the voltage cannot be switched at VR 350. Instead, SAPM 322 and EPGs 324 control the voltage switching for DDRIO 330.

SAPM 322 provides the logic for determining when to power down gated logic 332, and when to leave gated logic 332 powered on. Non-gated logic 334 does not get powered down. In one embodiment, SAPM 322 performs power management of DDRIO 330 as an extension of DDR self-refresh mode (SR). When DDR 340 is in self-refresh mode, it requires less interaction with DDRIO 330 than at other times. Thus, there can be an advantage in managing the gating of DDRIO logic in conjunction with DDR SR.

DDR 340 includes self-refresh control (SR CONTR) 342, which represents logic that handles self-refresh at DDR 340. Memory 344 represents the memory resources of DDR 340 in which data and/or commands are stored for access by processor 310. System 300 more specifically illustrates the interconnection or the interfacing of DDRIO 330 with DDR 340. More particularly, there can be interconnections (e.g., pins or pads) associated with gated logic 332, as well as interconnections associated with non-gated logic 334.

Figure 4:
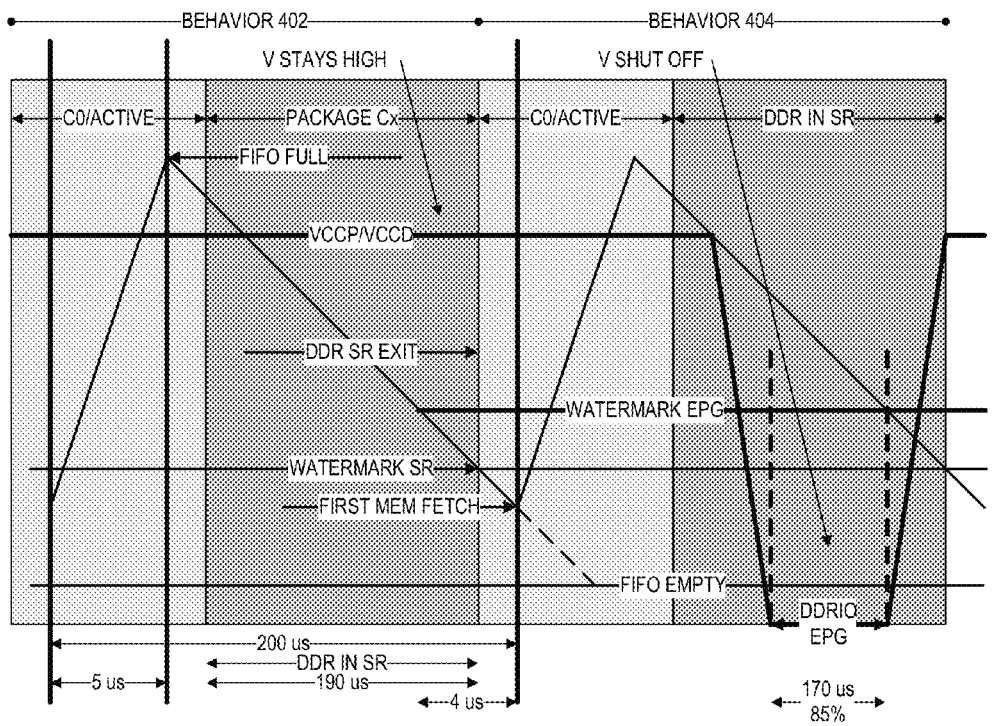
FIG. 4 is a diagram of an embodiment of behavior for critical and non-critical logic in deep sleep.

FIG. 4 is a diagram of an embodiment of behavior for critical and non-critical logic in deep sleep. Behavior 402 corresponds to the operation of logic that is critical. Namely, for the critical logic, the voltage (V) stays high throughout the cycle. It will be understood that behavior 402 can be considered standard behavior for I/O modules in traditional systems. As described herein, behavior 402 is only applied to logic that is not gated. Behavior 404 corresponds to the operation of the logic that is non-critical. Namely, the voltage (V) is shut off for at least part of the cycle, as explained in more detail below. Behavior 404 is possible through the use of gating the non-critical logic.

It will be understood that the timing is not drawn to scale. It will also be understood that a DDRIO example is shown, and different I/O modules will not necessarily follow the same behavior shown. Starting with behavior 402, there is a C0 or active state followed by a package Cx lower power state. During the active state, the I/O module places memory I/O in a FIFO (first-in, first-out) buffer until the FIFO is full. Once the FIFO is full, the package can enter a low power state, and the DDR goes into self-refresh while the FIFO is emptied. The voltage to the I/O logic is kept high during the low power state.

The system is set with a predetermined level, referred to in FIG. 4 as Watermark SR, which is the watermark level indicating when the DDR should come out of self refresh. Thus, when the FIFO fill line crosses the self-refresh watermark or threshold, the system triggers the DDR to exit self-refresh. The first memory fetch occurs after a short delay period after the DDR exits self-refresh.

Looking at one example of possible timing, filling the FIFO can take approximately 5 us, followed by a short transition time of a couple of microseconds, followed by approximately 190 us of DDR self-refresh.

For logic that is gated for low power operation, behavior 404 illustrates the filling of the FIFO buffer, followed by a trigger to shut off voltage to the DDRIO. In DDRIO EPG, the voltage is dropped to save power. In one embodiment, the system takes the power in the DDRIO down to the theoretical limit—zero, or nearly zero. Critical state of the DDR Control Registers (e.g., training information or other information) is isolated and kept active with the ungated I/O power supply (VccP-ungated) for DDR. In one embodiment, the gated power supply (VccP-gated) is taken to 0 V.

In one embodiment, the DDR is in self-refresh while the FIFO is emptied. At this point, the I/O Vcc is essentially powered off, thereby not consuming any static or leakage power. In one embodiment, upon an exit event, the PCU indicates to the SAPM to ramp the I/O VccP-gated back up. The PCU can also relock the PLLs, turn the clocks on, and perform an internal RESET to clear the states. The PCU can also clear the isolation logic to return the state of the DDRIO Control Registers, and then open up the BGF (Bubble Generator FIFOs) from the Memory Controller, and continue from where it left off in the execution stream. All of these operations can be accomplished in a matter of approximately 2-5 us, all in the CPU hardware, which makes the operations transparent to the operating system and existing power management software infrastructure.

It will be observed that Watermark DDRIO EPG is higher than Watermark SR, which means it will trigger sooner. The earlier triggering of the watermark accounts for the additional delay in exit from DDRIO EPG. In one embodiment, once the DDR goes into self-refresh, the SAPM will sequence the DDR into power down mode. In one embodiment, once the FIFO gets to the DDRIO EPG watermark point, the PCU will generate a wake event, and the SAPM will sequence DDRIO out of EPG mode. There is approximately 15% (7½% on either side) of ramp-down/ramp-up time to shut the voltage off and bring it back up again. There is approximately a 4 us period between when the Watermark DDRIO EPG is crossed, and when the first memory access can occur, which is longer than with the Watermark SR due to the additional time needed to wake the DDRIO.

Figure 5:
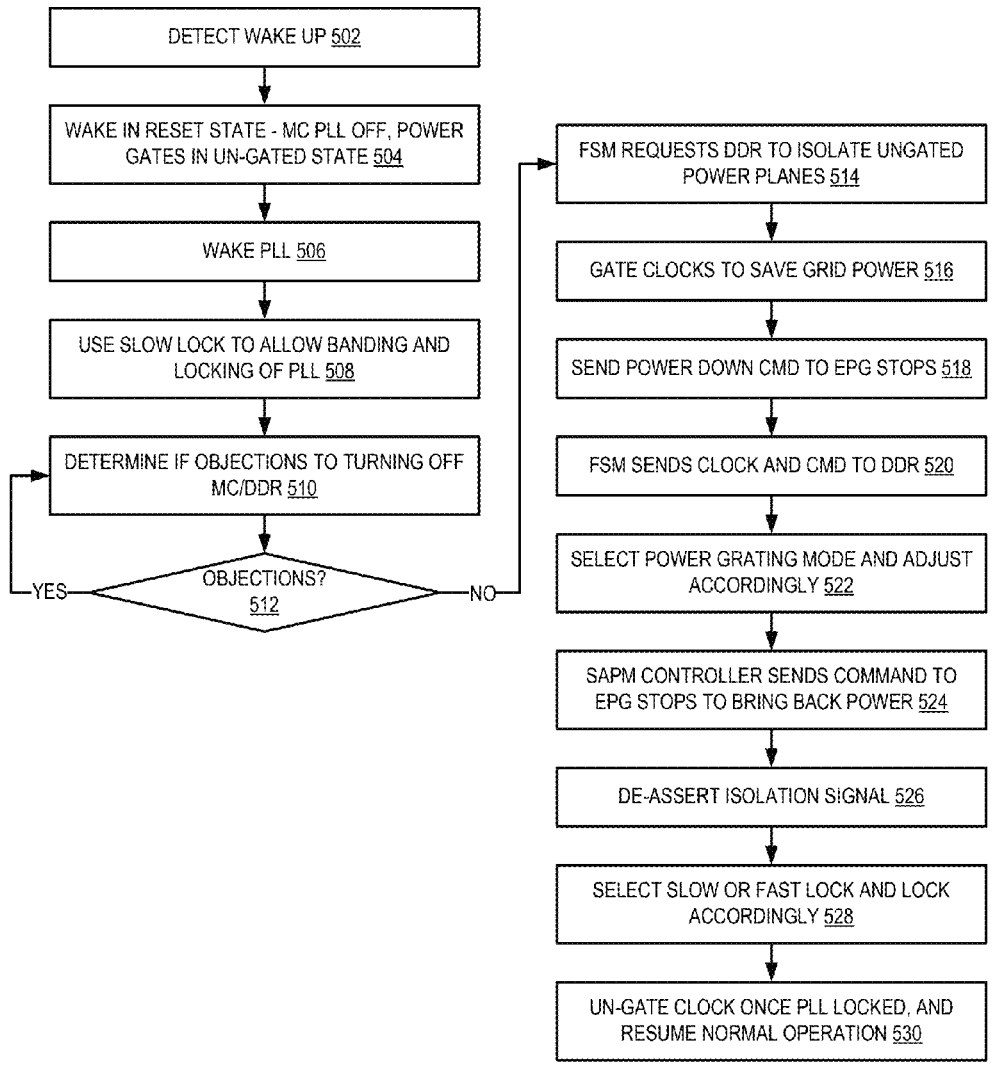
FIG. 5 is a flow diagram of an embodiment of a process for putting I/O in deep sleep.

FIG. 5 is a flow diagram of an embodiment of a process for putting I/O in deep sleep. The system detects a wake trigger, 502, such as reaching a watermark point. In one embodiment, a PCU generates a wake event, and initiates a sequence to bring the DDRIO out of power down state (EPG mode). In one embodiment, the sequence is executed in accordance with a finite state machine.

In one embodiment, the system wakes in reset state where the MC (memory controller) PLL (phase lock loop) is off, and the power gates are in a non-gated state, 504. The system determines it is time to wake the PLL, 506, and initially triggers the FSM to go through slow lock to allow for banding and locking the PLL to take place, 508. The system can then determine if there are any objections to shutting off the memory controller and DDR, 510. If there are objections (e.g., a PCU firmware component or other system component is not finished with an operation), 512, the system can continue to loop and wait.

When there are no objections to shutting off the MC and DDR, 512, in one embodiment the FSM requests the DDR to isolate the ungated power planes in preparation for power down, 514. In one embodiment, clocks are gated to save clock grid power, 516. In one embodiment, a sub-state machine sends a power down command to the EPG stops, 518. The power down command can include sending a clock and command to the DDR, 520, and selecting a power gating mode, 522. In one embodiment, an abrupt power grating mode is used, while in another embodiment, a gradual power gating mode is used. The command can contain various parameters to select the desired power gating mode.

In one embodiment, once the MC resources are required by the PCU firmware or various other reasons (such as a display engine), the SAPM controller can go into "Shift-Epg-Off" and sequence the command to the EPG stops to bring back the power, 524. The FSM de-asserts an isolation signal, 526. The system can determine whether to perform a slow lock or fast lock, and operate according to what is determined, 528. Once the PLL is locked (timer controlled), the clock is ungated and resume normal operation can resume in the I/O module, 530.

Figure 6:
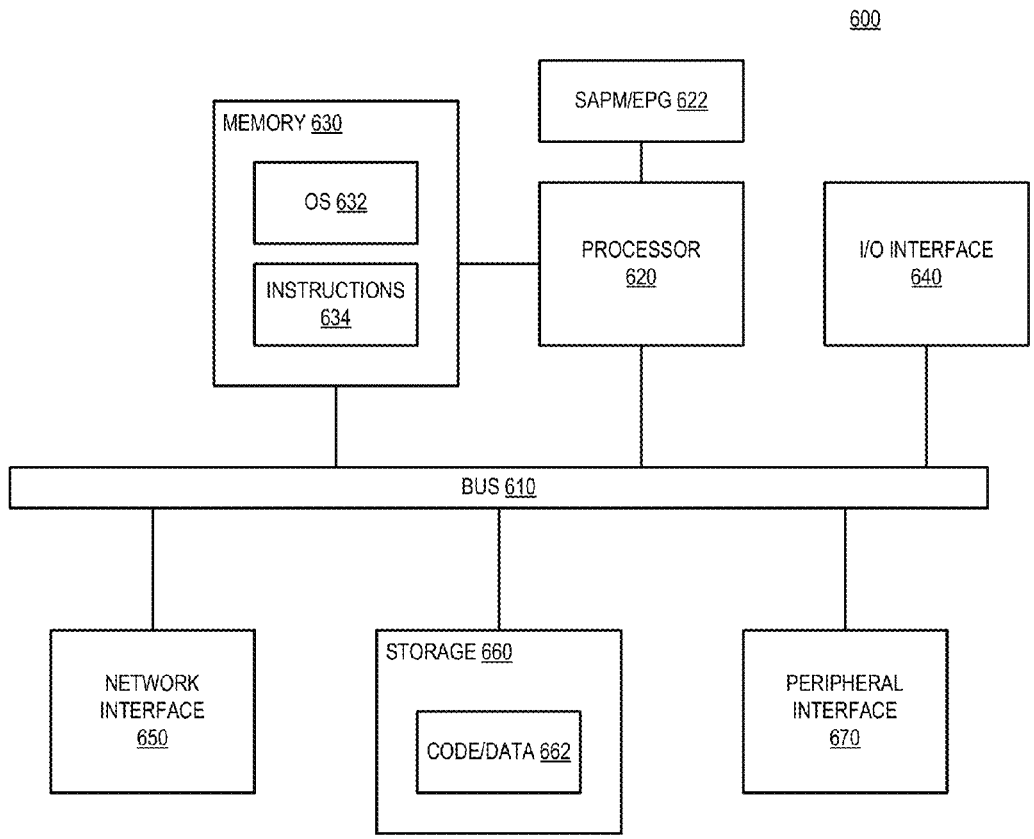
FIG. 6 is a block diagram of an embodiment of a computing system in which I/O logic shutdown can be utilized.

FIG. 6 is a block diagram of an embodiment of a computing system in which I/O logic shutdown can be utilized. System 600 represents a computing device in accordance with any embodiment described herein, and can be a laptop computer, a desktop computer, a server, a gaming or entertainment control system, a scanner, copier, printer, or other electronic device. System 600 includes processor 620, which provides processing, operation management, and execution of instructions for system 600. Processor 620 can include any type of microprocessor, central processing unit (CPU), processing core, or other processing hardware to provide processing for system 600. Processor 620 controls the overall operation of system 600, and can be include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 630 represents the main memory of system 600, and provides temporary storage for code to be executed by processor 620, or data values to be used in executing a routine. Memory 630 can include one or more memory devices such as read-only memory (ROM), flash memory, one or more varieties of random access memory (RAM), or other memory devices, or a combination of such devices. Memory 630 stores and hosts, among other things, operating system (OS) 632 to provide a software platform for execution of instructions in system 600. Additionally, other instructions 634 are stored and executed from memory 630 to provide the logic and the processing of system 600. OS 632 and instructions 634 are executed by processor 620.

Processor 620 and memory 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 can include, for example, one or more of a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 can also correspond to interfaces in network interface 650.

System 600 also includes one or more input/output (I/O) interface(s) 640, network interface 650, one or more internal mass storage device(s) 660, and peripheral interface 670 coupled to bus 610. I/O interface 640 can include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 can include an Ethernet adapter, wireless interconnection components, USB (universal serial bus), or other wired or wireless standards-based or proprietary interfaces.

Storage 660 can be or include any conventional medium for storing large amounts of data in a nonvolatile manner, such as one or more magnetic, solid state, or optical based disks, or a combination. Storage 660 hold code or instructions and data 662 in a persistent state (i.e., the value is retained despite interruption of power to system 600). Storage 660 can be generically considered to be a "memory," although memory 630 is the executing or operating memory to provide instructions to processor 620. Whereas storage 660 is nonvolatile, memory 630 can include volatile memory (i.e., the value or state of the data is indeterminate if power is interrupted to system 600).

Peripheral interface 670 can include any hardware interface not specifically mentioned above. Peripherals refer generally to devices that connect dependently to system 600. A dependent connection is one where system 600 provides the software and/or hardware platform on which operation executes, and with which a user interacts.

In one embodiment, system 600 includes SAPM/EPG control 622 for at least one I/O module of processor 620. The SAPM/EPG 622 enables selective gating of I/O logic to power down the I/O module during processor idle times, thus saving power.

Figure 7:
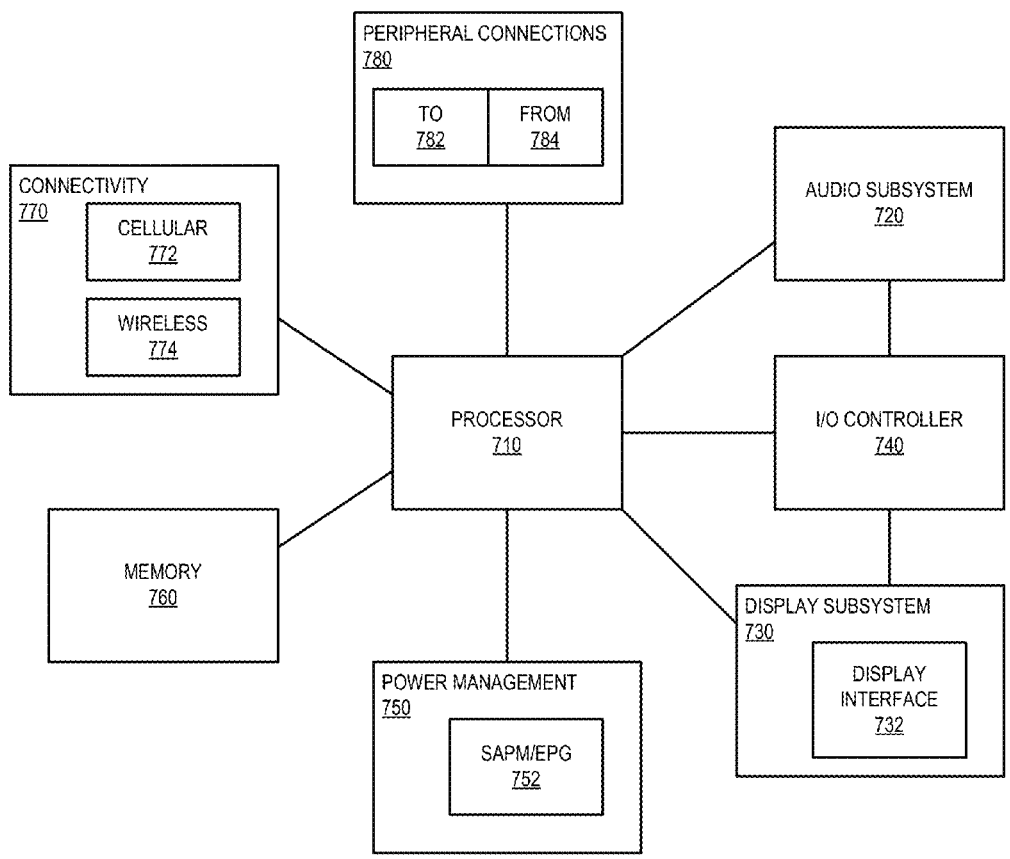
FIG. 7 is a block diagram of an embodiment of a mobile device in which I/O logic shutdown can be utilized.

FIG. 7 is a block diagram of an embodiment of a mobile device in which I/O logic shutdown can be utilized. Device 700 represents a mobile computing device, such as a computing tablet, a mobile phone or smartphone, a wireless-enabled e-reader, or other mobile device. It will be understood that certain of the components are shown generally, and not all components of such a device are shown in device 700.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations can also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. In another example, if display subsystem includes a touchscreen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that can be included in device 700. The input can be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation. Memory subsystem 760 includes memory devices for storing information in device 700. Memory 760 can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700.

Connectivity 770 includes hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication (including optical communication) occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, power management 750 includes SAPM/EPG control 752 for at least one I/O module of processor 710. The SAPM/EPG 752 enables selective gating of I/O logic to power down the I/O module during processor idle times, thus saving power.

Processor cores can be implemented in different ways, for different purposes, and in different processors. For instance, implementations of such cores can include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors can include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which can include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that can include on the same die the described CPU (sometimes referred to as the application core(s) or application processor(s)), the above described coprocessor, and additional functionality. Exemplary core architectures are described next, followed by descriptions of exemplary processors and computer architectures.

Figure 8:
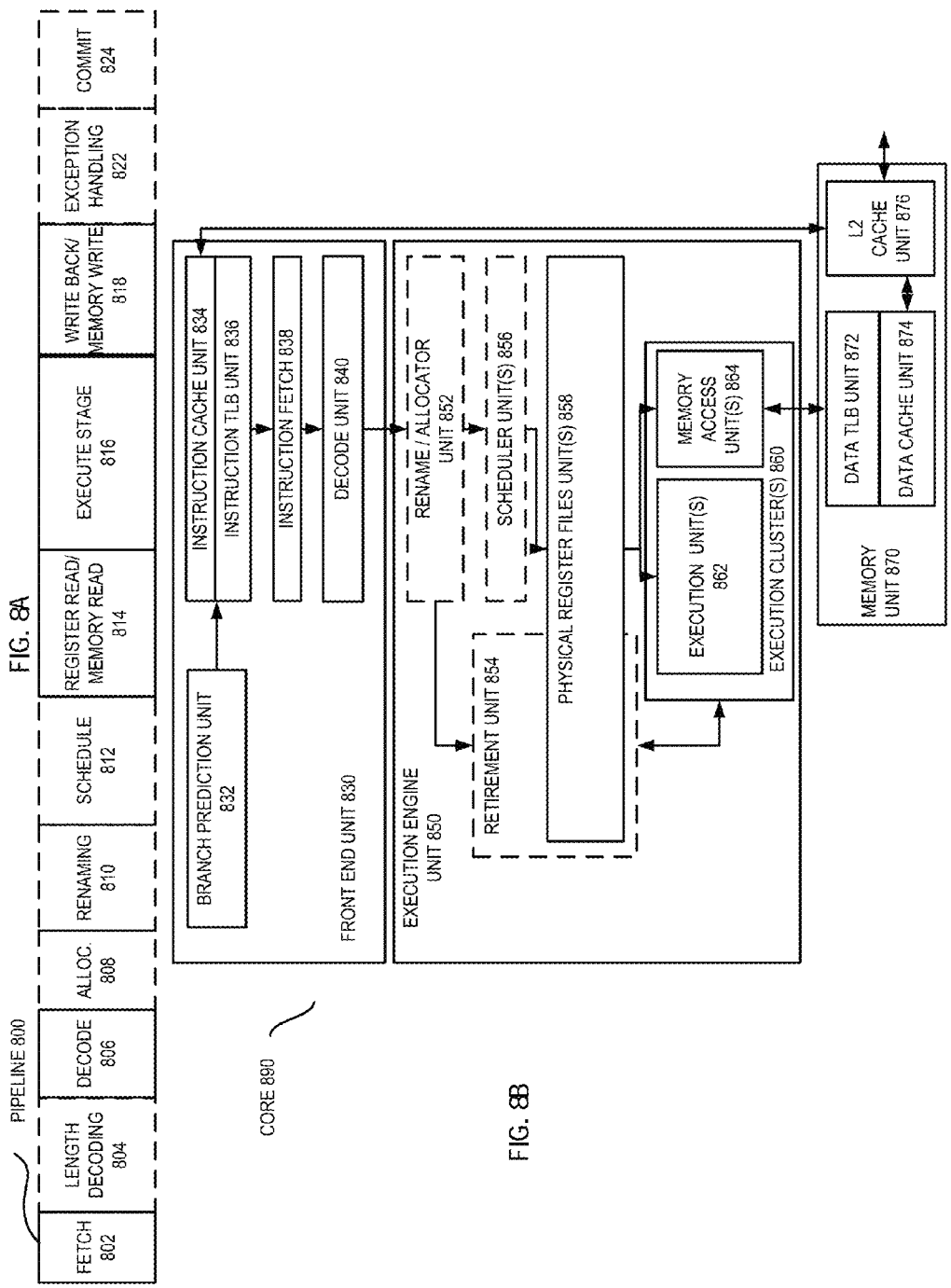
FIG. 8A is a block diagram illustrating an embodiment of both an exemplary in-order pipeline and an exemplary register renaming, out-of-order issue/execution pipeline.
FIG. 8B is a block diagram illustrating an embodiment of both an exemplary embodiment of an in-order architecture core and an exemplary register renaming, out-of-order issue/execution architecture core to be included in a processor.

FIG. 8A is a block diagram illustrating an embodiment of both an exemplary in-order pipeline and an exemplary register renaming, out-of-order issue/execution pipeline. FIG. 8B is a block diagram illustrating an embodiment of both an exemplary embodiment of an in-order architecture core and an exemplary register renaming, out-of-order issue/execution architecture core to be included in a processor. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 can be a reduced instruction set computing (RISC) core, a complex instruction set computing (CISC) core, a very long instruction word (VLIW) core, or a hybrid or alternative core type. As yet another option, the core 890 can be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) can decode instructions, and generate as an output one or more micro-operations, micro-code entry points, microinstructions, other instructions, or other control signals, which are decoded from, or which otherwise reflect, or are derived from, the original instructions. The decode unit 840 can be implemented using various different mechanisms. Examples of suitable mechanisms include, but are not limited to, look-up tables, hardware implementations, programmable logic arrays (PLAs), microcode read only memories (ROMs), or other mechanisms. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, or other scheduling mechanism. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), or other data types. In one embodiment, the physical register file(s) unit 858 comprises a vector register unit, a write mask register unit, and a scalar register unit. These register units can provide architectural vector registers, vector mask registers, and general purpose registers. The physical register file(s) unit(s) 858 is overlapped by the retirement unit 854 to illustrate various ways in which register renaming and out-of-order execution can be implemented (e.g., using a reorder buffer(s) and a retirement register file(s); using a future file(s), a history buffer(s), and a retirement register file(s); using a register maps and a pool of registers). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 can perform various operations (e.g., shifts, addition, subtraction, multiplication) and on various types of data (e.g., scalar floating point, packed integer, packed floating point, vector integer, vector floating point). While some embodiments can include a number of execution units dedicated to specific functions or sets of functions, other embodiments can include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each has its own scheduler unit, physical register file(s) unit, and/or execution cluster—and in the case of a separate memory access pipeline, certain embodiments are implemented in which only the execution cluster of this pipeline has the memory access unit(s) 864). It will be understood that where separate pipelines are used, one or more of these pipelines can be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 can include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture can implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units can be involved in the exception handling stage 822; and 8) the retirement unit 854 and the physical register file(s) unit(s) 858 perform the commit stage 824.

The core 890 can support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., including the instruction(s) described herein. In one embodiment, the core 890 includes logic to support a packed data instruction set extension (e.g., AVX1, AVX2), thereby allowing the operations used by many multimedia applications to be performed using packed data.

It will be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it will be understood that register renaming can be used in an in-order architecture. While the illustrated embodiment of the processor also includes separate instruction and data cache units 834/874 and a shared L2 cache unit 876, alternative embodiments can have a single internal cache for both instructions and data, such as, for example, a Level 1 (L1) internal cache, or multiple levels of internal cache. In some embodiments, the system can include a combination of an internal cache and an external cache that is external to the core and/or the processor. Alternatively, all of the cache can be external to the core and/or the processor.

In one embodiment, an execution unit of a processor is coupled to an I/O module, separated into gated and ungated logic in accordance with any embodiment described herein. In one embodiment, the gated logic of the I/O module is powered down during a low power state of the processor.

Figure 9:
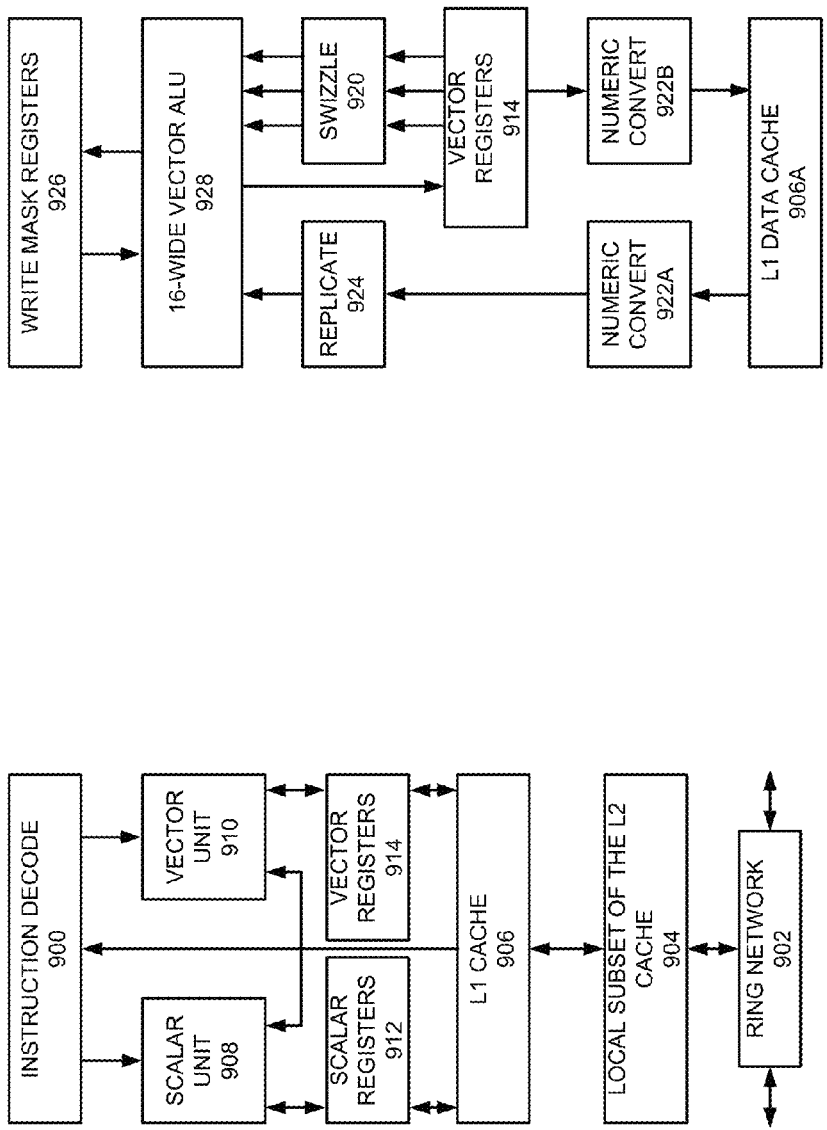
FIGS. 9A-B illustrate a block diagram of a more specific exemplary in-order core architecture, which core would be one of several logic blocks (including other cores of the same type and/or different types) in a chip.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of an embodiment of a single processor core, along with its connection to the on-die interconnect network 902 and with its local subset of the Level 2

(L2) cache 904. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments can use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. In one embodiment, each ring data-path is 1012-bits wide per direction.

FIG. 9B is an expanded view of one embodiment of part of the processor core in FIG. 9A. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

In one embodiment, a processor includes an I/O module, separated into gated and ungated logic in accordance with any embodiment described herein. In one embodiment, the gated logic of the I/O module is powered down during a low power state of the processor.

Figure 10:
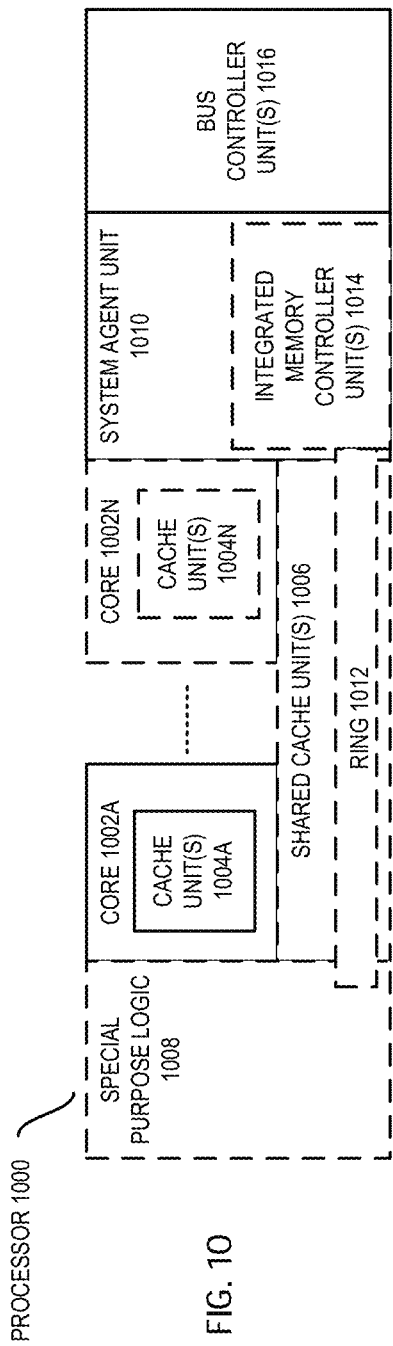
FIG. 10 is a block diagram of an embodiment of a processor that can have more than one core, an integrated memory controller, and/or integrated graphics.

FIG. 10 is a block diagram of an embodiment of a processor 1000 that can have more than one core, can have an integrated memory controller, and can have integrated graphics. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 can include: 1) a CPU with the special purpose logic 1008 being integrated graphics and/or scientific (throughput) logic (which can include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 can be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor can be implemented on one or more chips. The processor 1000 can be a part of and/or can be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 can include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments can use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 can include for example a power control unit (PCU) and a display unit. The PCU can be or include logic and components needed for regulating the power state of the cores 1002A-N and the integrated graphics logic 1008. The display unit is for driving one or more externally connected displays.

The cores 1002A-N can be homogenous or heterogeneous in terms of architecture instruction set; that is, two or more of the cores 1002A-N can be capable of execution the same instruction set, while others can be capable of executing only a subset of that instruction set or a different instruction set.

In one embodiment, a processor includes an I/O module, separated into gated and ungated logic in accordance with any embodiment described herein. In one embodiment, the gated logic of the I/O module is powered down during a low power state of the processor. The gated logic can be managed by the PCU.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a variety of systems or electronic devices capable of incorporating a processor and/or other execution logic as disclosed herein are generally suitable.

Figure 11:
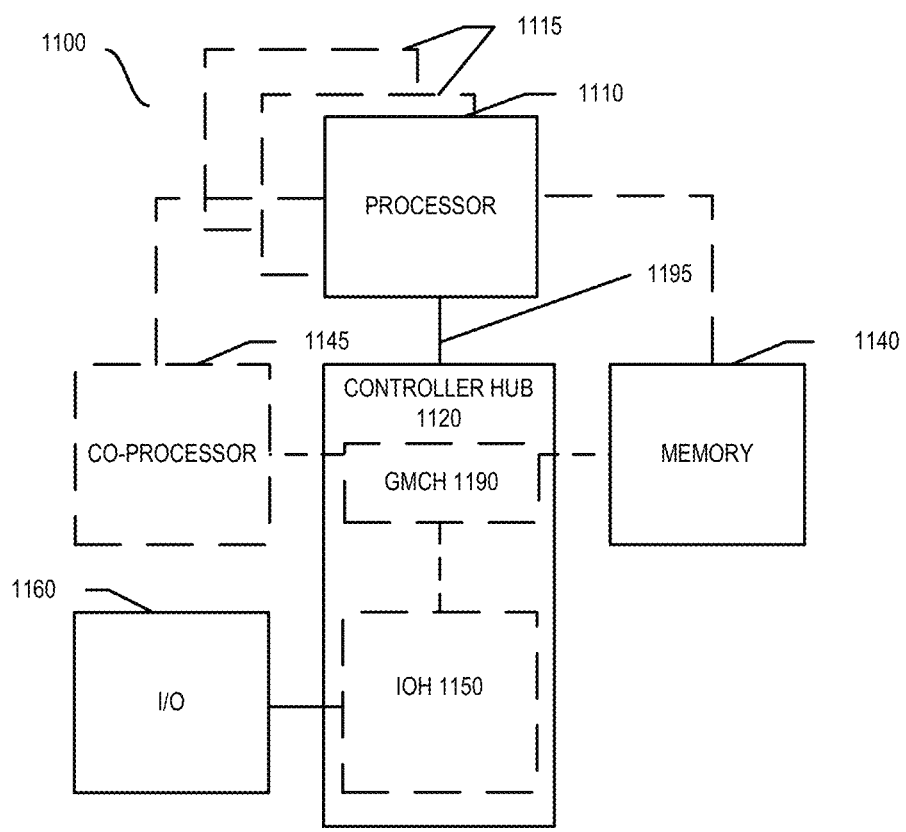
FIGS. 11-14 are block diagrams of exemplary computer architectures.

Referring now to FIG. 11, shown is a block diagram of an embodiment of a system 1100. The system 1100 can include one or more processors 1110, 1115, which are coupled to a controller hub 1120. In one embodiment the controller hub 1120 includes a graphics memory controller hub (GMCH) 1190 and an Input/Output Hub (IOH) 1150 (which can be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 can include one or more of the processing cores described herein and can be some version of the processor 1000.

The memory 1140 can be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 can include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions can be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

In one embodiment, the processor includes an I/O module, separated into gated and ungated logic in accordance with any embodiment described herein. In one embodiment, the gated logic of the I/O module is powered down during a low power state of the processor.

Figure 12:
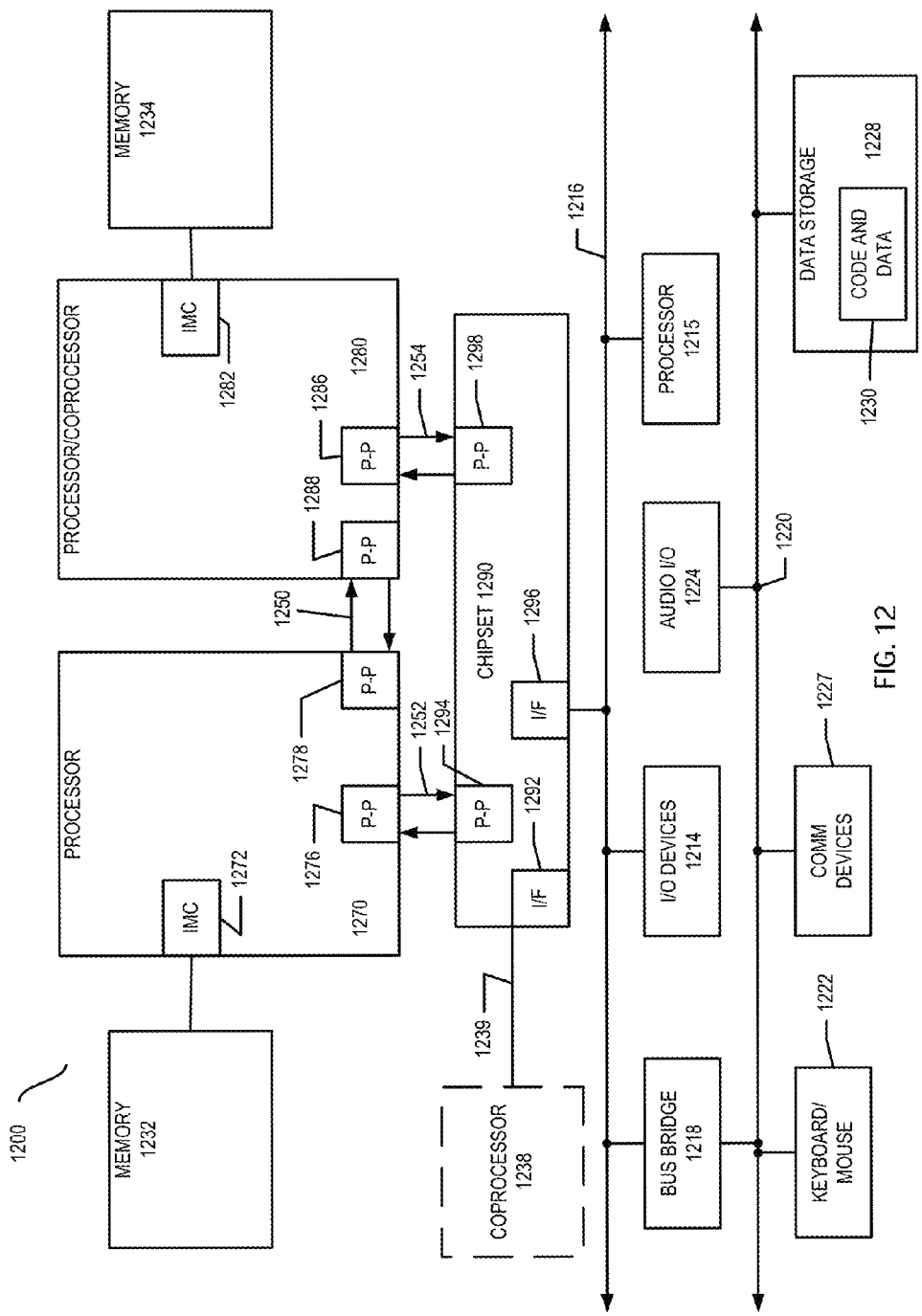

Referring now to FIG. 12, shown is a block diagram of an embodiment of a first more specific exemplary system 1200. As shown in FIG. 12, multiprocessor system 1200 is a point-to-point interconnect system, and includes a first processor 1270 and a second processor 1280 coupled via a point-to-point interconnect 1250. Each of processors 1270 and 1280 can be some version of the processor 1000. In one embodiment, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 can exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which can be portions of main memory locally attached to the respective processors.

Processors 1270, 1280 can each exchange information with a chipset 1290 via individual P-P interfaces 1252, 1254 using point to point interface circuits 1276, 1294, 1286, 1298. Chipset 1290 can optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) can be included in either processor or outside of both processors, yet connected with the processors via P-P interconnect, such that either or both processors' local cache information can be stored in the shared cache if a processor is placed into a low power mode.

Chipset 1290 can be coupled to a first bus 1216 via an interface 1296. In one embodiment, first bus 1216 can be a Peripheral Component Interconnect (PCI) bus, or a bus such as a PCI Express bus or another third generation I/O interconnect bus, but these are non-limiting examples.

As shown in FIG. 12, various I/O devices 1214 can be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 can be a low pin count (LPC) bus. Various devices can be coupled to a second bus 1220 including, for example, a keyboard and/or mouse 1222, communication devices 1227 and a storage unit 1228 such as a disk drive or other mass storage device which can include instructions/code and data 1230, in one embodiment. Further, an audio I/O 1224 can be coupled to the second bus 1220. Note that other architectures are possible. For example, instead of the point-to-point architecture of FIG. 12, a system can implement a multi-drop bus or other such architecture.

In one embodiment, at least one processor includes an I/O module, separated into gated and ungated logic in accordance with any embodiment described herein. In one embodiment, the gated logic of the I/O module is powered down during a low power state of the processor.

Figure 13:
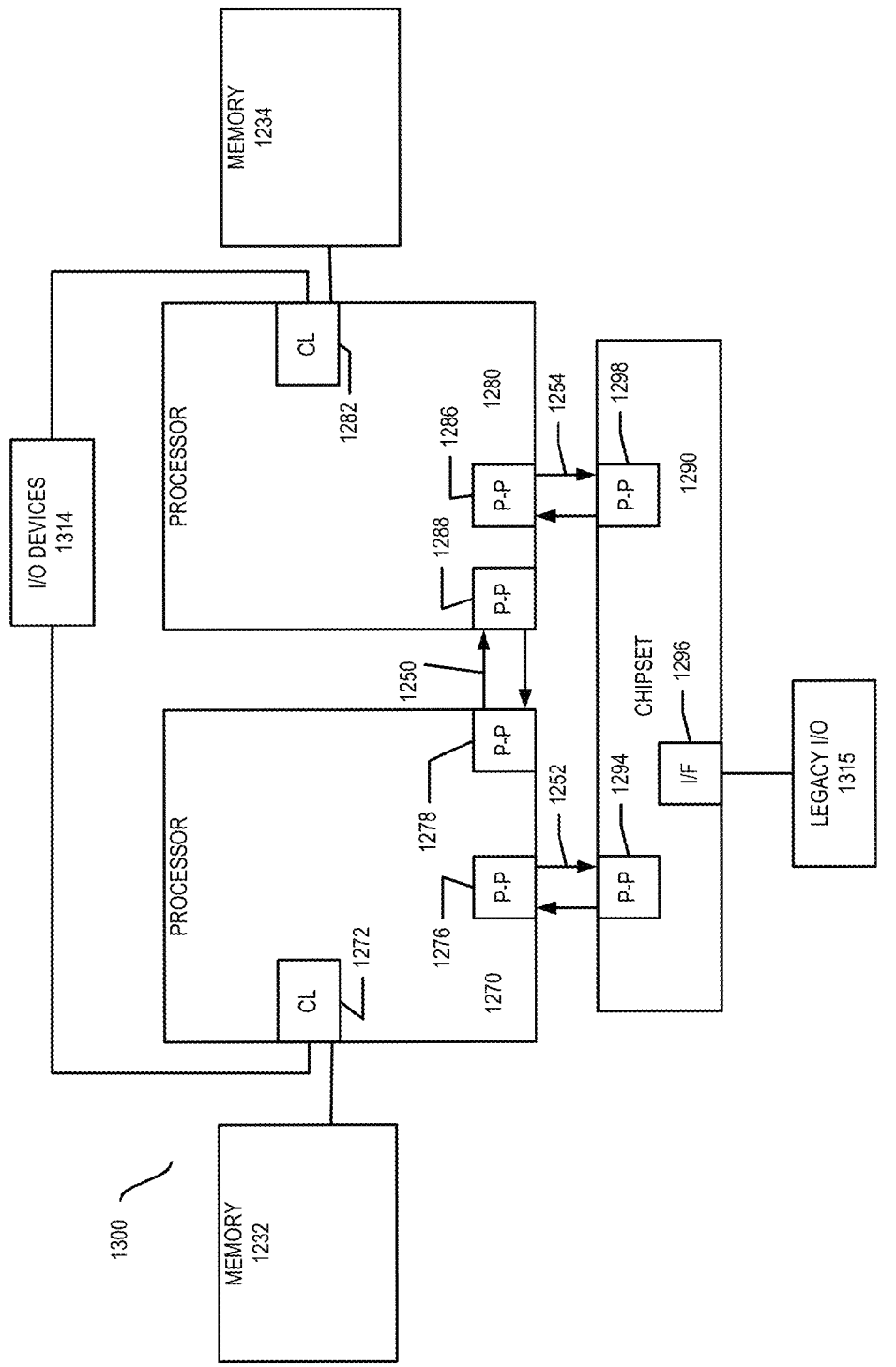

Referring now to FIG. 13, shown is a block diagram of an embodiment of a second more specific exemplary system 1300. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 can include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

In one embodiment, at least one of the processors includes an I/O module, separated into gated and ungated logic in accordance with any embodiment described herein. In one embodiment, the gated logic of the I/O module is powered down during a low power state of the processor.

Figure 14:
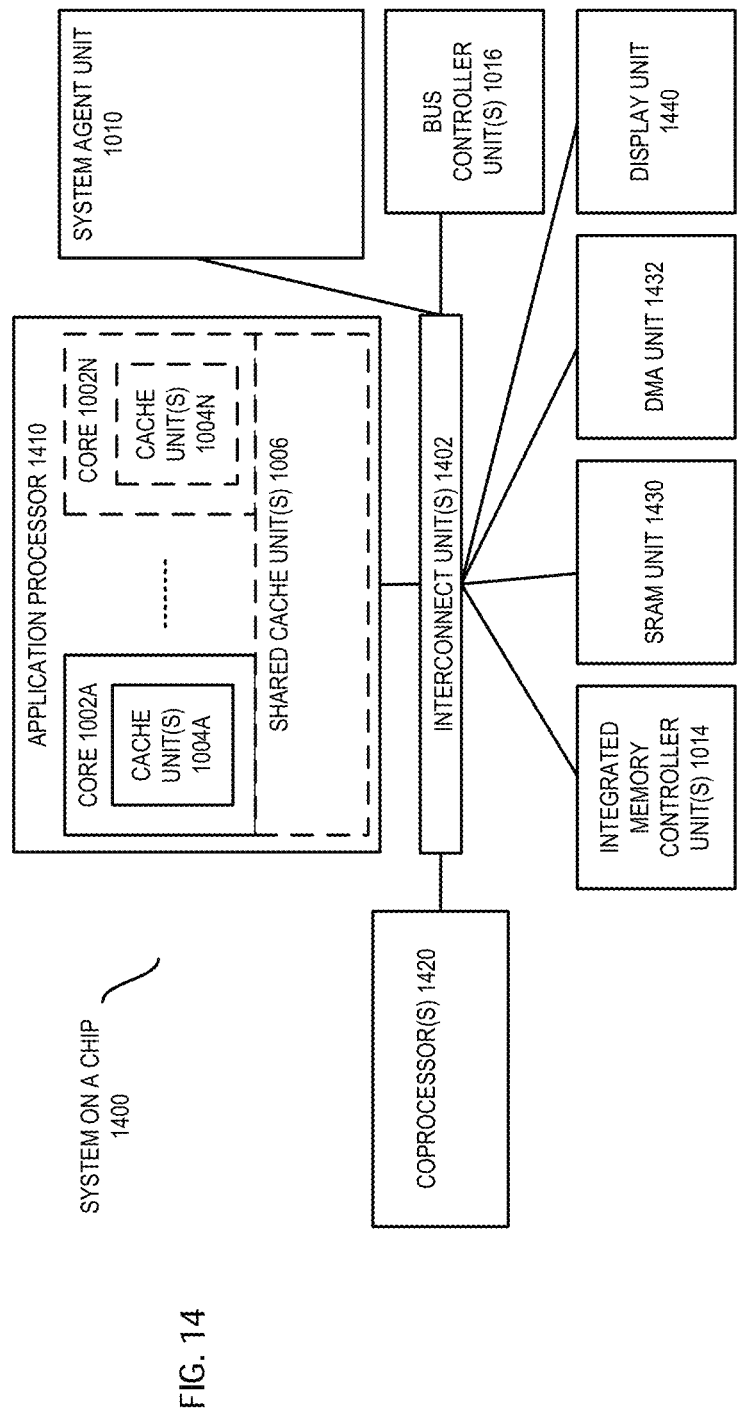

Referring now to FIG. 14, shown is a block diagram of an embodiment of a SoC 1400. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N and shared cache unit(s) 1006; a system agent unit 1010; a bus controller unit(s) 1016; an integrated memory controller unit(s) 1014; a set or one or more coprocessors 1420 which can include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Program code, such as code 1230 illustrated in FIG. 12, can be applied to input instructions to perform the functions described herein and generate output information. The output information can be applied to one or more output devices, in any known manner. For purposes of this application, a processing system includes any system that has a processor, such as, for example; a digital signal processor (DSP), a microcontroller, an application specific integrated circuit (ASIC), or a microprocessor.

The program code can be implemented in a high level procedural or object oriented programming language to communicate with a processing system. The program code can also be implemented in assembly or machine language, if desired. In fact, the mechanisms described herein are not limited in scope to any particular programming language. In any case, the language can be a compiled or interpreted language.

In some cases, an instruction converter can be used to convert an instruction from a source instruction set to a target instruction set. For example, the instruction converter can translate (e.g., using static binary translation, dynamic binary translation including dynamic compilation), morph, emulate, or otherwise convert an instruction to one or more other instructions to be processed by the core. The instruction converter can be implemented in software, hardware, firmware, or a combination thereof. The instruction converter can be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter can be implemented in software, firmware, hardware, or various combinations thereof. FIG. 15 shows a program in a high level language 1502 can be compiled using an x86 compiler 1504 to generate x86 binary code 1506 that can be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 can be compiled using an alternative instruction set compiler 1508 to generate alternative instruction set binary code 1510 that can be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that can be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A circuit comprising:
    input/output (I/O) logic on a processor to connect to a device external to the processor, the I/O logic separated into gated logic and ungated logic, the gated logic to be unpowered in a low power mode, the ungated logic to be powered in the low power mode, wherein the gated logic is logic that is not used to at least maintain configuration of the I/O logic, wherein the I/O logic further comprises interface logic to a dual data rate (DDR) memory device, wherein the ungated logic to maintain critical state of the DDR Control Registers and I/O power supply (VccP-ungated) for DDR; and a power manager coupled to the I/O logic to manage power to the I/O logic by gating a system voltage to the gated logic and passing the system voltage to the ungated logic in the low power mode.

2. The circuit of claim 1, wherein the ungated logic comprises logic to provide functions critical to operation of the device external to the processor.

3. The circuit of claim 1, wherein the ungated logic comprises logic to change a system configuration value when power is cut off to the logic.

4. The circuit of claim 1, wherein the power manager further comprises:
embedded power gates (EPGs) to switch power to the gated logic.

5. The circuit of claim 1, wherein the power manager to manage power to the I/O logic in low power mode as an extension of DDR self-refresh.

6. A processor comprising:
input/output (I/O) logic on a processor to connect to a device external to the processor, the I/O logic separated into gated logic and ungated logic, the gated logic to be unpowered in a low power mode, the ungated logic to be powered in the low power mode, wherein the gated logic is logic that is not used to at least maintain configuration of the I/O logic, wherein the I/O logic further comprises interface logic to a dual data rate (DDR) memory device and the ungated logic to maintain critical state of the DDR Control Registers and I/O power supply (VccP-ungated) for DDR;

a power manager coupled to the I/O logic to manage power to the I/O logic by gating a system voltage to the gated logic and passing the system voltage to the ungated logic in the low power mode; and a power control unit (PCU) coupled to the power manager to trigger the power manager to put the I/O logic in the low power mode.

7. The processor of claim 6, wherein the ungated logic comprises logic that provides functions critical to operation critical to the operation of the device external to the processor.

8. The processor of claim 6, wherein the ungated logic comprises logic that changes a system configuration value when power is cut off to the logic.

9. The processor of claim 6, wherein the power manager further comprises:

embedded power gates (EPGs) to switch power to the gated logic.

10. The processor of claim 6, wherein the power manager manages power to the I/O logic in the low power mode as an extension of DDR self-refresh.

11. The processor of claim 6, wherein the PCU computes heuristics to determine when to trigger the power manager to put the I/O logic in low power mode.

12. A system comprising:
a processor including
input/output (I/O) logic on a processor to connect to a device external to the processor, the I/O logic separated into gated logic and ungated logic, the gated logic to be unpowered in a low power mode, the ungated logic to be powered in the low power mode, wherein the gated logic is logic that is not used to at least maintain configuration of the I/O logic, wherein the I/O logic further comprises interface logic to a dual data rate (DDR) memory device and the ungated logic to maintain critical state of the DDR Control Registers and I/O power supply (VccP-ungated) for DDR; and a power manager coupled to the I/O logic to manage power to the I/O logic by gating a system voltage to the gated logic and passing the system voltage to the ungated logic in the low power mode; and a hardware controller to manage a touchscreen interface device.

13. The system of claim 12, wherein the ungated logic comprises logic that provides functions critical to operation critical to the operation of the device external to the processor.

14. The system of claim 12, wherein the ungated logic comprises logic that changes a system configuration value when power is cut off to the logic.

15. The system of claim 12, wherein the power manager further comprises:
embedded power gates (EPGs) to switch power to the gated logic.

16. The system of claim 12, wherein the power manager manages power to the I/O logic in the low power mode as an extension of DDR self-refresh.

17. The system of claim 12, further comprising:
a power control unit (PCU) coupled to the power manager to trigger the power manager to put the I/O logic in the low power mode.

18. The system of claim 17, wherein the PCU computes heuristics to determine when to trigger the power manager to put the I/O logic in low power mode.

* * * * *